(12) United States Patent
Rothstein

(10) Patent No.: US 6,777,828 B1
(45) Date of Patent: Aug. 17, 2004

(54) MANAGEMENT APPARATUS

(76) Inventor: Ronald J. Rothstein, 1728 Via Boronada, Palas Verdes, CA (US) 90274

( * ) Notice: Subject to any disclaimer, the term of this patent is extended or adjusted under 35 U.S.C. 154(b) by 299 days.

(21) Appl. No.: 10/056,443

(22) Filed: Jan. 25, 2002

(51) Int. Cl.$^7$ ................................................ G08B 1/00
(52) U.S. Cl. ......................... 307/140; 307/141; 307/116
(58) Field of Search ................................ 307/139, 140, 307/141, 141.4, 116

(56) References Cited

U.S. PATENT DOCUMENTS

| | | | | |
|---|---|---|---|---|
| 3,581,029 A | * | 5/1971 | Noiles ......................... | 307/141 |
| 3,833,779 A | * | 9/1974 | Leone ......................... | 307/141 |
| 3,879,332 A | * | 4/1975 | Leone ......................... | 307/141 |
| 4,246,495 A | * | 1/1981 | Pressman ..................... | 307/141 |
| 4,279,012 A | * | 7/1981 | Beckedorff et al. ......... | 307/141.4 |
| 4,348,696 A | * | 9/1982 | Beier .......................... | 725/29 |
| 4,484,220 A | * | 11/1984 | Beetner ...................... | 348/730 |
| 4,588,901 A | * | 5/1986 | Maclay et al. .............. | 307/141 |
| 4,647,735 A | * | 3/1987 | Sicher ...................... | 200/43.08 |
| 4,899,370 A | * | 2/1990 | Kameo et al. ......... | 379/102.03 |
| 5,021,916 A | * | 6/1991 | Hubbard ...................... | 361/171 |
| 5,051,837 A | * | 9/1991 | McJunkin .................... | 725/26 |
| 5,070,219 A | * | 12/1991 | Grosskrueger et al. .. | 200/43.08 |
| 5,120,236 A | * | 6/1992 | Gilbert ....................... | 439/133 |
| 5,125,492 A | * | 6/1992 | Treleaven et al. .......... | 307/141 |
| 5,231,310 A | | 7/1993 | Oh | |
| 5,231,661 A | | 7/1993 | Harnum et al. | |
| 5,258,656 A | * | 11/1993 | Pawlick ...................... | 307/141 |
| 5,283,475 A | | 2/1994 | Berger | |
| 5,331,353 A | | 7/1994 | Levenson et al. | |
| 5,359,540 A | * | 10/1994 | Ortiz ........................ | 307/115 |
| D352,667 S | | 11/1994 | Chen | |
| 5,731,763 A | * | 3/1998 | Herweck et al. ....... | 340/825.69 |
| 5,917,256 A | * | 6/1999 | Broadbent, II .............. | 307/141 |
| 5,923,739 A | * | 7/1999 | Disalvo .................. | 379/102.03 |
| 6,005,476 A | * | 12/1999 | Valiulis .................. | 340/310.01 |
| 6,011,328 A | * | 1/2000 | Smith ......................... | 307/139 |
| 6,307,463 B1 | * | 10/2001 | Chou ....................... | 340/309.8 |
| 6,321,381 B1 | * | 11/2001 | Yuen et al. .................... | 725/28 |
| 6,380,852 B1 | * | 4/2002 | Hartman et al. ............ | 307/140 |
| 6,389,122 B1 | * | 5/2002 | Park ...................... | 379/102.01 |
| 6,454,579 B1 | * | 9/2002 | Davis ......................... | 439/134 |
| 6,519,208 B2 | * | 2/2003 | DeVries ..................... | 307/141 |
| 2002/0152412 A1 | * | 10/2002 | Southworth et al. ........ | 713/502 |
| 2002/0185917 A1 | * | 12/2002 | Goss ......................... | 307/112 |

FOREIGN PATENT DOCUMENTS

| | | | | | |
|---|---|---|---|---|---|
| FR | 2634041 A | * | 1/1990 | .......... | G08C/19/16 |
| JP | 57133795 A | * | 8/1982 | ............ | H04Q/9/08 |
| JP | 03165690 A | * | 7/1991 | ............ | H04Q/9/00 |

OTHER PUBLICATIONS

MOXA, "NPower Commander Data Sheet", 2001.*

* cited by examiner

Primary Examiner—Gregory J. Toatley, Jr.
Assistant Examiner—Roberto J. Rios

(57) ABSTRACT

A management apparatus for allowing a parent to limit the amount of time a specific user is allowed access to an electronic device. The management apparatus includes an enclosure that has an interior space. A controller for processing a plurality of electronic operations is positioned in the interior space. An alphanumeric display displays information and is attached to the front side of the enclosure. A keypad for inputting numerical data is attached to the front side of the enclosure. A modem positioned in the interior space of the enclosure. A phone jack is attached to the second side of the enclosure. A power cord is attached to the second side of the enclosure. A plurality of receptacles allows coupling of electrical cords from electrical devices. A cover member covers the first end of the enclosure and is releasably attachable to the first end by a plurality of fasteners.

17 Claims, 4 Drawing Sheets

MANAGEMENT APPARATUS

BACKGROUND OF THE INVENTION

1. Field of the Invention

The present invention relates to management devices and more particularly pertains to a new management apparatus for allowing a parent to limit the amount of time a specific user is allowed access to an electronic device.

2. Description of the Prior Art

The use of management devices is known in the prior art. U.S. Pat. No. 5,331,353 describes a device for limiting the amount of time an electrical appliance such as a television may be used. Another type of management device is U.S. Pat. No. 5,051,837 details a home entertainment equipment control apparatus.

While these devices fulfill their respective, particular objectives and requirements, the need remains for a device that allows the parent remote access via a telephone for changes in programming as needed.

SUMMARY OF THE INVENTION

The present invention meets the needs presented above by the incorporation of an internal modem.

Still yet another object of the present invention is to provide a new management apparatus that is capable of coupling to a number of different electronic devices or appliances simultaneously.

Even still another object of the present invention is to provide a new management apparatus that is simple to use making access to even young children feasible.

To this end, the present invention generally comprises an enclosure that has an interior space. A controller for processing a plurality of electronic operations is positioned in the interior space. An alphanumeric display displays information and is attached to the front side of the enclosure. A keypad for inputting numerical data is attached to the front side of the enclosure. A modem positioned in the interior space of the enclosure. A phone jack is attached to the second side of the enclosure. A power cord is attached to the second side of the enclosure. A plurality of receptacles allows coupling of electrical cords from electrical devices. A cover member covers the first end of the enclosure and is releasably attachable to the first end by a plurality of fasteners.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
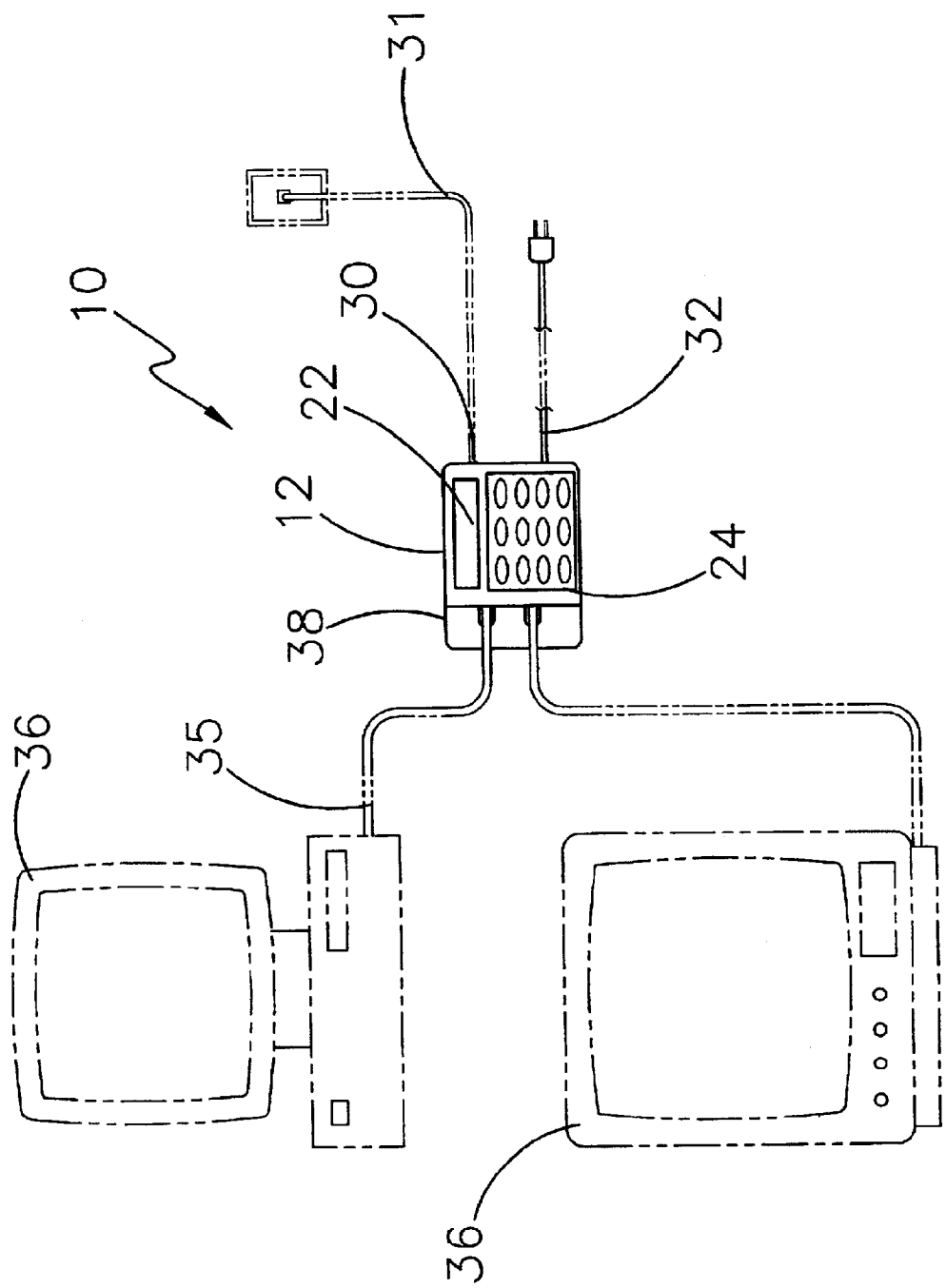
FIG. 1 is a schematic top view of a new management apparatus according to the present invention.
Figure 2:
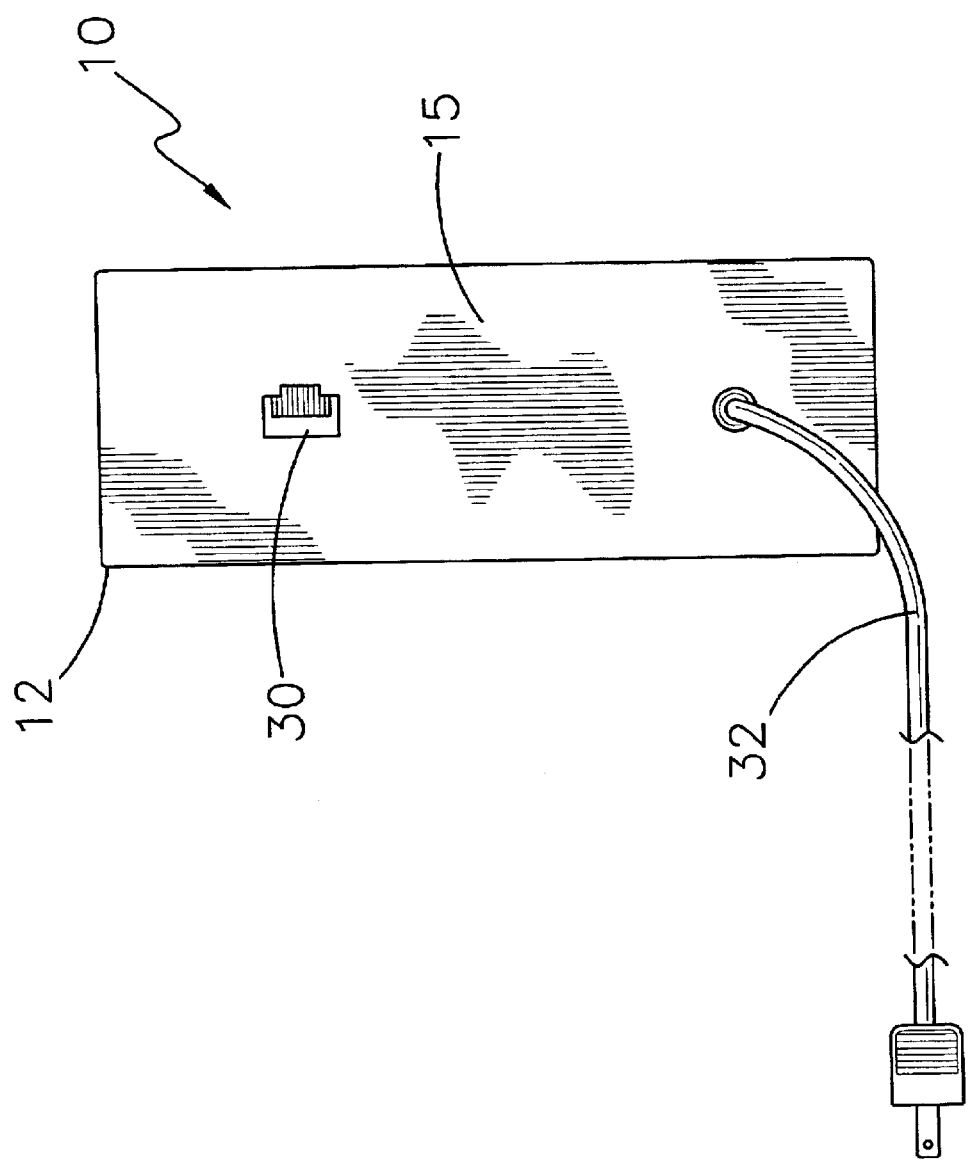
FIG. 2 is a schematic end view of the present invention.
Figure 3:
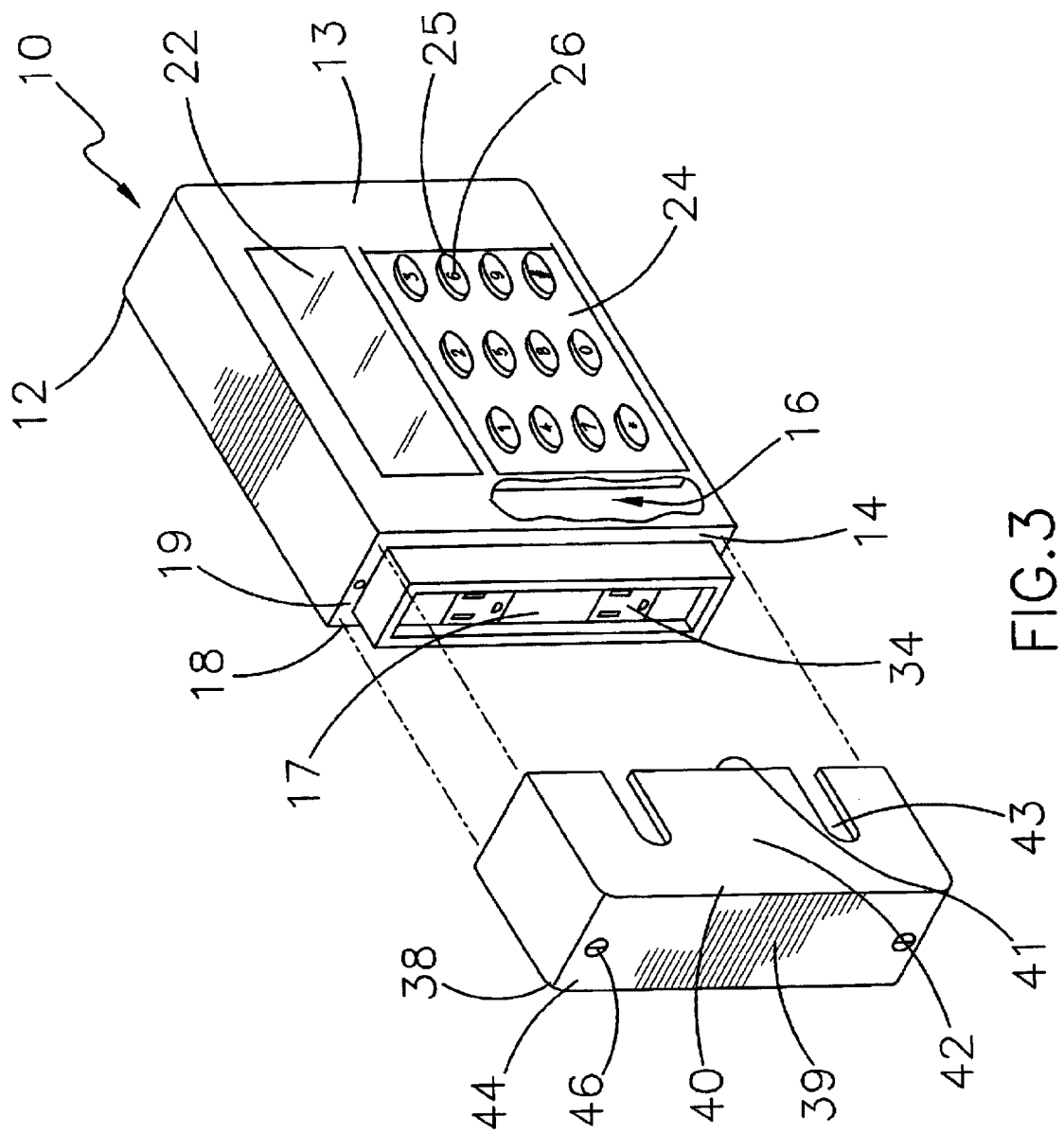
FIG. 3 is a schematic perspective view of the present invention.
Figure 4:
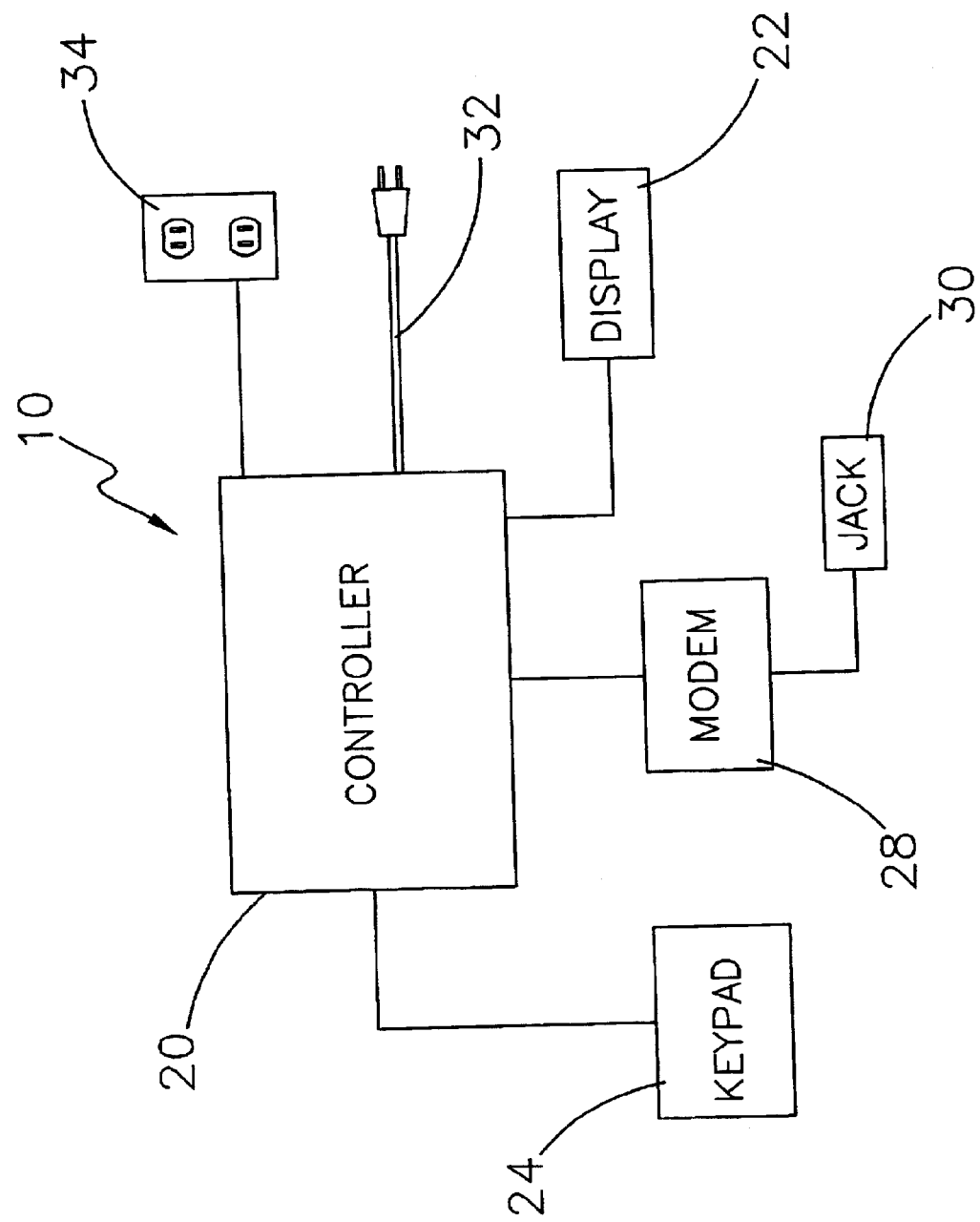
FIG. 4 is an electrical block diagram of the present invention.

With reference now to the drawings, and in particular to FIGS. 1 through 4 thereof, a new management apparatus embodying the principles and concepts of the present invention and generally designated by the reference numeral 10 will be described.

As best illustrated in FIGS. 1 through 4, the management apparatus 10 generally comprises an enclosure 12 that has a front side 13, a first end 14, and a second end 15. The enclosure 12 has an interior space 16. The first end 14 includes a middle section 17 recessed from outer edges 18 of the first end 14 such that a ledge is defined.

A controller 20 for processing a plurality of electronic operations is positioned in the interior space 16 of the enclosure 12.

An alphanumeric display 22 for displaying information to the user and the parent is attached to the front side 13 of the enclosure 12. The display is electrically coupled to the controller 20.

A keypad 24 for inputting numerical data is attached to the front side 13 of the enclosure 12. The keypad 24 includes a plurality of buttons 25. Each of the buttons 25 has a number indicia 26 thereon. The keypad 24 is electrically coupled to the controller 20.

A modem 28 for transmitting and receiving verbal commands from the parent via a telephone is positioned in the interior space 16 of the enclosure 12. The modem 28 is electrically coupled to the controller 20.

A phone jack 30 for allowing the parent to selectively couple a phone line 31 to the enclosure 12 is attached to the second side of the enclosure 12. The phone jack 30 is electrically coupled to the modem 28.

A power cord 32 is attached to the second side of the enclosure 12. The power cord 32 is electrically coupled to the controller 20.

A plurality of receptacles 34 for allowing the parent to selectively couple at least one electrical cord 35 from an electrical device 36 to the enclosure 12 is integrally coupled to the first end 14 of the enclosure 12. Each of the receptacles 34 is electrically coupled to the controller 20.

A cover member 38 for covering the first end 14 of the enclosure 12 includes an end wall 39 and a peripheral wall 40 that is attached to and extends away from the end wall 39. The cover member 38 is releasably attachable to the first end 14. Dimensions of the cover member 38 inside the peripheral wall 40 is generally equal to outside dimensions of the middle section 17 of the first end 14 of the enclosure 12 such that inner edges 41 of the peripheral wall 40 abut the ledge when the cover member 38 is attached to the enclosure 12.

A front portion 42 of the peripheral wall 40 has a plurality of slots 43 extending therethrough. Each of the slots 43 extends from the inner edge of the front portion 42 of the peripheral wall 40 towards the end wall 39 such that the electrical cord 35 from one of the electronic devices 36 may pass through one of the slots 43 when the cover member 38 is attached to the enclosure 12.

A plurality of fasteners 46 for securing the cover member 38 to the enclosure 12 is positioned adjacent outer ends 44 of the end wall 39 of the cover member 38.

The parent may program the controller 20 for an allotted amount of time each specific user may operate the electronic device 36 during a specific time period once the user has put in a security code allowing them access.

The parent may access the controller 20 remotely via the telephone through the modem 28 to modify programming of the controller 20.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A management apparatus for allowing a parent to limit the amount of time a specific user is allowed access to an electronic device, said apparatus comprising:

an enclosure having a front side, a first end, and a second end, said enclosure having an interior space;

a controller for processing a plurality of electronic operations being positioned in said interior space of said enclosure;

an alphanumeric display for displaying information to the user and the parent being attached to said front side of said enclosure;

a keypad for inputting numerical data being attached to said front side of said enclosure;

a modem for transmitting and receiving verbal commands from the parent via a telephone being positioned in said interior space of said enclosure;

a phone jack for allowing the parent to selectively couple a phone line to said enclosure being attached to said second side of said enclosure;

a power cord being attached to said second side of said enclosure;

a plurality of receptacles for allowing the parent to selectively couple at least one electrical cord from the electronic devices to said enclosure;

a cover member for covering said first end of said enclosure including an end wall and a peripheral wall attached to and extending away from said end wall, said cover member being releasably attachable to said first end; and a plurality of fasteners for securing said cover member to said enclosure.

2. The management apparatus as set forth in claim 1, further comprising said first end including a middle section, said middle section being recessed from outer edges of said first end such that a ledge is defined.

3. The management apparatus as set forth in claim 1, further comprising said display being electrically coupled to said controller.

4. The management apparatus as set forth in claim 1, further comprising said keypad including a plurality of buttons, each of said buttons having a number indicia thereon.

5. The management apparatus as set forth in claim 1, further comprising said keypad being electrically coupled to said controller.

6. The management apparatus as set forth in claim 1, further comprising said modem being electrically coupled to said controller.

7. The management apparatus as set forth in claim 1, further comprising said phone jack being electrically coupled to said modem.

8. The management apparatus as set forth in claim 1, further comprising said power cord being electrically coupled to said controller.

9. The management apparatus as set forth in claim 1, further comprising each of said receptacles being integrally coupled to said first end of said enclosure.

10. The management apparatus as set forth in claim 1, further comprising each of said receptacles being electrically coupled to said controller.

11. The management t apparatus as set forth in claim 3, further comprising dimensions of said cover member inside said peripheral wall being generally equal to outside dimensions of said middle section of said first end of said enclosure such that inner edges of said peripheral wall abut said ledge when said cover member is attached to said enclosure.

12. The management apparatus as set forth in claim 1, further comprising a front portion of said peripheral wall having a plurality of slots extending therethrough.

13. The management apparatus as set forth in claim 12, further comprising each of said slots extending from an inner edge of said front portion of said peripheral wall towards said end wall such that the electrical cord from one of the electronic devices may pass through one of said slots when said cover member is attached to said enclosure.

14. The management apparatus as set forth in claim 1, further comprising being positioned adjacent outer ends of said end wall of said cover member.

15. The management apparatus as set forth in claim 1, wherein the parent may program said controller for an allotted amount of time each specific user may operate the electronic device during a specific time period once the user has put in a security cod allowing them access.

16. The management apparatus as set forth in claim 1, wherein the parent may access said controller remotely via the telephone through said modem to modify programming of said controller.

17. A management apparatus for allowing a parent to limit the amount of time a specific user is allowed access to an electronic device, said apparatus comprising:

an enclosure having a front side, a first end, and a second end, said enclosure having an interior space, said first end including a middle section, said middle section being recessed from outer edges of said first end such that a ledge is defined;

a controller for processing a plurality of electronic operations being positioned in said interior space of said enclosure;

an alphanumeric display for displaying information to the user and the parent being attached to said front side of said enclosure, said display being electrically coupled to said controller;

a keypad for inputting numerical data being attached to said front side of said enclosure, said keypad including a plurality of buttons, each of said buttons having a number indicia thereon, said keypad being electrically coupled to said controller;

a modem for transmitting and receiving verbal commands from the parent via a telephone being positioned in said interior space of said enclosure, said modem being electrically coupled to said controller;

a phone jack for allowing the parent to selectively couple a phone line to said enclosure being attached to said second side of said enclosure, said phone jack being electrically coupled to said modem;

a power cord being attached to said second side of said enclosure, said power cord being electrically coupled to said controller;

a plurality of receptacles for allowing the parent to selectively couple at least one electrical cord from the electronic devices to said enclosure being integrally coupled to said first end of said enclosure, each of said receptacles being electrically coupled to said controller;

a cover member for covering said first end of said enclosure including an end wall and a peripheral wall attached to and extending away from said end wall, said cover member being releasably attachable to said first end, dimensions of said cover member inside said peripheral wall being generally equal to outside dimensions of said middle section of said first end of said enclosure such that inner edges of said peripheral wall abut said ledge when said cover member is attached to said enclosure, a front portion of said peripheral wall having a plurality of slots extending therethrough, each of said slots extending from an inner edge of said front portion of said peripheral wall towards said end wall such that the electrical cord from one of the electronic devices may pass through one of said slots when said cover member is attached to said enclosure;

a plurality of fasteners for securing said cover member to said enclosure being positioned adjacent outer ends of said end wall of said cover member;

wherein the parent may program said controller for an allotted amount of time each specific user may operate the electronic device during a specific time period once the user has put in a security cod allowing them access; and wherein the parent may access said controller remotely via the telephone through said modem to modify programming of said controller.

* * * * *